US006057524A

United States Patent [19]

Katooka et al.

[11] Patent Number: 6,057,524

[45] Date of Patent: May 2, 2000

[54] PLASMA ARC UTILIZING APPARATUS

[75] Inventors: Masao Katooka, Kawanishi; Shuji Yokoyama, Kobe; Masako Ikeda, Kyoto; Yumi Sato, Nishinomiya, all of Japan

[73] Assignee: Sansha Electric Manufacturing Company, Limited, Osaka, Japan

[21] Appl. No.: 09/189,537

[22] Filed: Nov. 10, 1998

[30] Foreign Application Priority Data

Nov. 12, 1997 [JP] Japan .................................... 9-329505

[51] Int. Cl.$^{7}$ ..................................................... B23K 10/00

[52] U.S. Cl. ................................ 219/121.54; 219/121.48; 219/137 PS; 219/121.39

[58] Field of Search ......................... 219/121.48, 121.39, 219/121.36, 121.44, 121.45, 137 PS, 132, 133, 137 R, 130.1

[56] References Cited

U.S. PATENT DOCUMENTS 3,567,902 3/1971 Stearns et al. .......................... 219/132
4,027,125 5/1977 Peek et al. .......................... 200/148 R
4,142,091 2/1979 Biethan, Sr. ........................ 219/131 R
4,591,683 5/1986 Eke ................................ 219/10.55 B
4,902,226 2/1990 Elliott et al. ............................ 433/104
5,041,710 8/1991 Hamal ....................................... 219/70
5,726,416 3/1998 Katooka et al. .................. 219/121.48

FOREIGN PATENT DOCUMENTS 6-38985 5/1994 Japan .

*Primary Examiner*—Mark Paschall
*Attorney, Agent, or Firm*—Duane, Morris & Heckscher LLP

[57] ABSTRACT

A plasma arc utilizing apparatus includes a power supply unit disposed in a housing. The power supply unit converts an AC voltage to a DC voltage, which is applied to load for generating an arc therein. A compressor is disposed in the same housing for supplying the load with compressed gas that is to be ionized by the arc. The compressor has a leg by which the compressor is secured to the housing. The leg is embedded in an elastic material secured in the housing.

6 Claims, 2 Drawing Sheets

PLASMA ARC UTILIZING APPARATUS

This application is based on Japanese Patent Application No. HEI 9-329505 filed on Nov. 12, 1997, which is incorporated herein by reference.

The present invention relates to plasma arc utilizing apparatuses, such as a plasma arc welder and a plasma arc cutter, and, more particularly, to plasma arc utilizing apparatuses having a housing enclosing a compressor for providing compressed air for use in generating a plasma arc, as well as a power supply unit for use in generating the plasma arc.

BACKGROUND OF THE INVENTION

A plasma arc utilizing apparatus like a plasma arc cutter includes a power supply unit therefor. In one example of such power supply unit, an AC voltage is converted into a DC voltage, which is then converted to a high-frequency voltage by an inverter. The high-frequency voltage is then transformed by a transformer, and the resulting transformed high-frequency voltage is rectified and smoothed into a DC voltage. The ultimate DC voltage is applied between a torch and a workpiece, e.g. a material to be cut by a plasma arc cutter, whereby an arc is generated between them. A compressed gas, e.g. compressed air, supplied from a compressor is jetted from the torch toward the workpiece and is ionized by the arc generated between the torch and the workpiece to thereby cut the workpiece. The use of an inverter in such plasma arc cutters can eliminate the need for using a large-sized transformer and a reactor in the power supply unit, and, therefore, the power supply unit can be small in size. Since the size of the power supply unit can be made smaller, the compressor can be placed also in a housing in which the power supply unit is placed. Thus, plasma arc utilizing apparatuses as a whole can be small in size. An example of such air plasma arc cutter is disclosed in Japanese Examined Patent Publication No. HEI 6-38985 published on May 25, 1994.

When it is operating, a compressor vibrates significantly. Accordingly, when a compressor is mounted in a housing, in which also a power supply unit is disposed, it is necessary to take measures for preventing vibrations from being transmitted from the compressor to the housing as much as possible. One possible measure is to use vibration absorbing rubber. Bolts may extend through the lower panel of the housing, legs of the compressor and vibration absorbing rubber members, with the rubber members interposed between the lower panel and the respective legs of the compressor. Nuts are screwed onto the bolts to thereby secure the compressor to the lower panel of the housing. Vibrations generated by the compressor are absorbed by the respective rubber members, so that noise, which would be caused by vibrations, can be suppressed to some extent. It may also reduce, to some extent, vibrations which would otherwise be transmitted to printed circuit boards with electronic components forming the power supply unit disposed thereon.

With the above-described vibration preventing arrangement, however, vibrations produced by the compressor are transmitted through the bolts to the housing and to the printed circuit boards in the housing through the housing. Accordingly, it is impossible to completely suppress transmission of vibrations. When the printed circuit boards vibrate, wiring of electronic components on the boards could be cut, which would cause failure of the power supply unit. Further, it is troublesome to secure the legs of the compressor by bolts and nuts.

Accordingly, an object of the present invention is to provide a plasma arc utilizing apparatus with sufficiently suppressed vibrations of a compressor.

SUMMARY OF THE INVENTION

A plasma arc utilizing apparatus according to one embodiment of the present invention includes a housing in which a power supply unit is disposed. The power supply unit converts an AC voltage to a DC voltage, which is applied to a load to produce an arc. A compressor is disposed in the housing for supplying compressed gas to the load. The arc ionizes compressed gas. The compressor has a leg by which it is secured to the housing. An elastic member, which may be a lump of elastic material, is disposed in and fixed to the housing. The elastic member surrounds the leg of the compressor.

The compressor may have plural legs, and the housing may comprise two halves. The legs of the compressor may be located on the respective ones of the two halves of the housing.

With the above-described arrangement, since the leg of the compressor is surrounded by the elastic member, nothing transmits vibrations of the compressor to the housing.

The housing may include spaced upper and lower panels and two side panels each connecting corresponding side edges of the upper and lower panels. The elastic member has contact surfaces contacting the side panels and the lower panel of the housing.

Since the elastic member contacts the bottom and side panels of housing, it can absorb vibrations which would be transmitted to the bottom and side panels.

The elastic member may have top and bottom surfaces. The housing has contact portions therein, which contact the top and bottom surfaces of the elastic member to thereby prevent vertical displacement of the elastic member.

Since the top and bottom surfaces of the elastic member are in contact with the contact portions of the housing so as to prevent vertical displacement of the elastic member, vibrations of the compressor in the vertical direction are absorbed by the elastic member and are not transmitted to the housing.

The housing may include spaced upper and lower panels and two side panels each connecting corresponding side edges of the upper and lower panels, and the elastic member may have top and bottom surfaces and two end surfaces extending substantially perpendicularly to the side panels of the housing. The housing has contact portions contacting the bottom and end surfaces of the elastic member to prevent the elastic member from moving.

Since the top, bottom and end surfaces of the elastic member are in contact with the contact portions of the housing, and, therefore, the elastic member is prevented from moving, vibrations of the compressor in the vertical direction and in the direction substantially parallel with the side panels of the housing are absorbed by the elastic member and, therefore, not transmitted to the housing.

The housing may include spaced upper and lower panels and two side panels each connecting corresponding side edges of the upper and lower panels, and the elastic member may have top and bottom surfaces, side surfaces extending substantially in parallel with the side panels of the housing, and two end surfaces extending substantially perpendicularly to the side panels of the housing. The housing further includes contact portions which contact with the top, bottom, end and side surfaces of the elastic member to thereby prevent displacement of the elastic member.

Thus, the vibrations of the compressor in the vertical and lateral directions and in the direction substantially parallel to the side panels of the housing are absorbed by the elastic member and are not transmitted to the housing.

The housing may include spaced upper and lower panels and two side panels each connecting corresponding side edges of the upper and lower panels, and may comprise two halves having mating surfaces lying in a plane which is substantially in parallel with the side panels. The two halves abut against each other to form the housing. The compressor may have two legs which, when the compressor is disposed in the housing, are located in the respective ones of the two halves of the housing. Two elastic members are used for the respective ones of the legs of the compressor. Each of the elastic members has top and bottom surfaces. Also, it has a first side surface located closer to and substantially in parallel with the side panel of the housing half in which it is disposed, a second side surface located remoter from the side panel than the first side surface and two end surfaces extending substantially perpendicularly to the side panel. Each leg of the compressor extends into the corresponding elastic member through the second side surface. The housing has contact portions which are in contact with the top and bottom surfaces, the first side surface and the two end surfaces of the two elastic members, to thereby prevent the respective elastic members from moving.

The distal ends of the two legs of the compressor are put into the respective elastic members through the second side surfaces of the elastic members. Then, one of the elastic members with one leg put therein is placed in a space defined by the contact portions formed on the corresponding one of the two housing halves, and the other elastic member is placed in a similar space in the other housing half. The two housing halves are joined together, so that the compressor can be easily mounted in the housing without need for using bolts or the like.

PREFERRED EMBODIMENT

Figure 1:
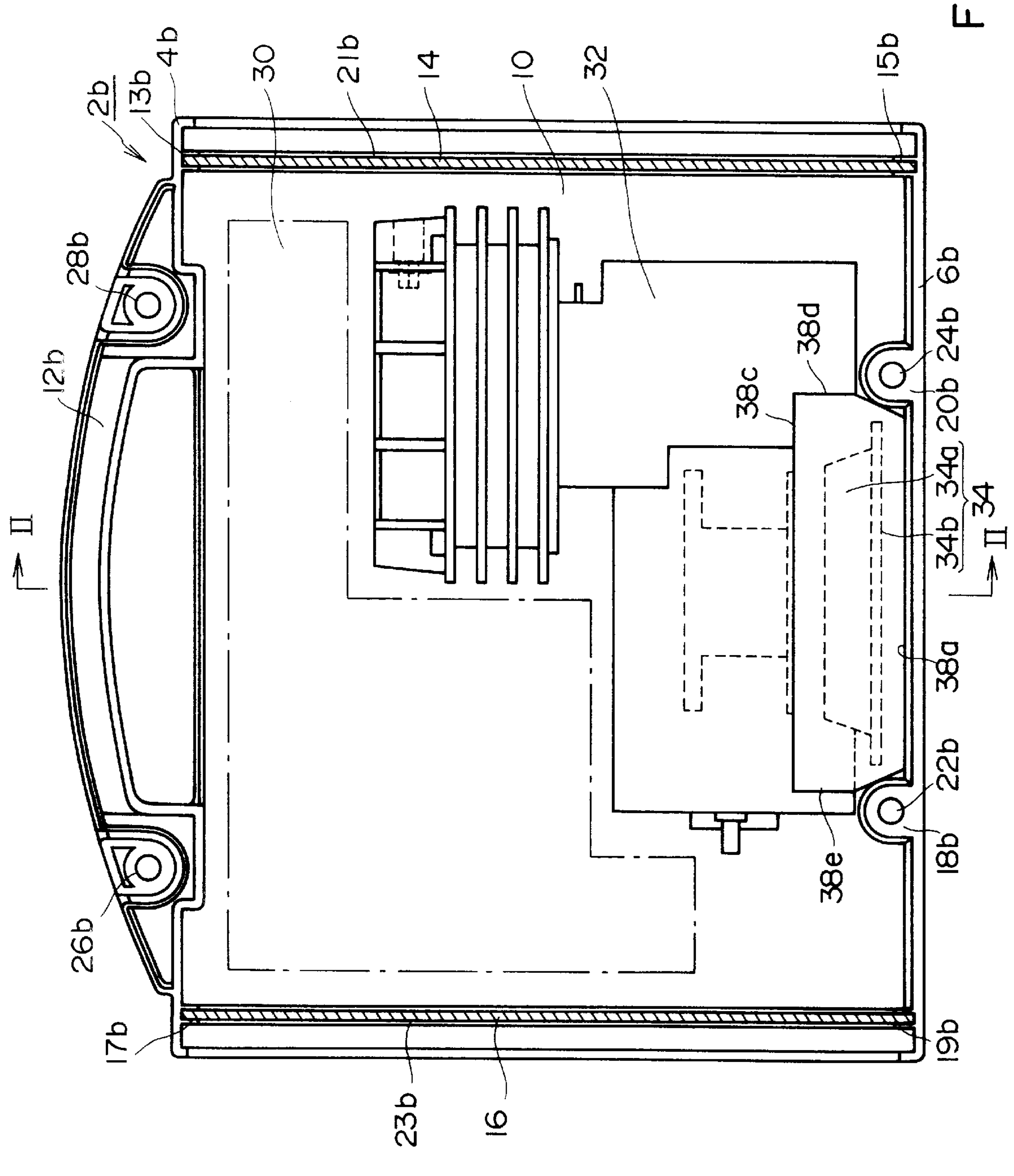
FIG. 1 is a side elevational view of an air-plasma arc cutter according to one embodiment of the present invention, with one of two housing halves removed.
Figure 2:
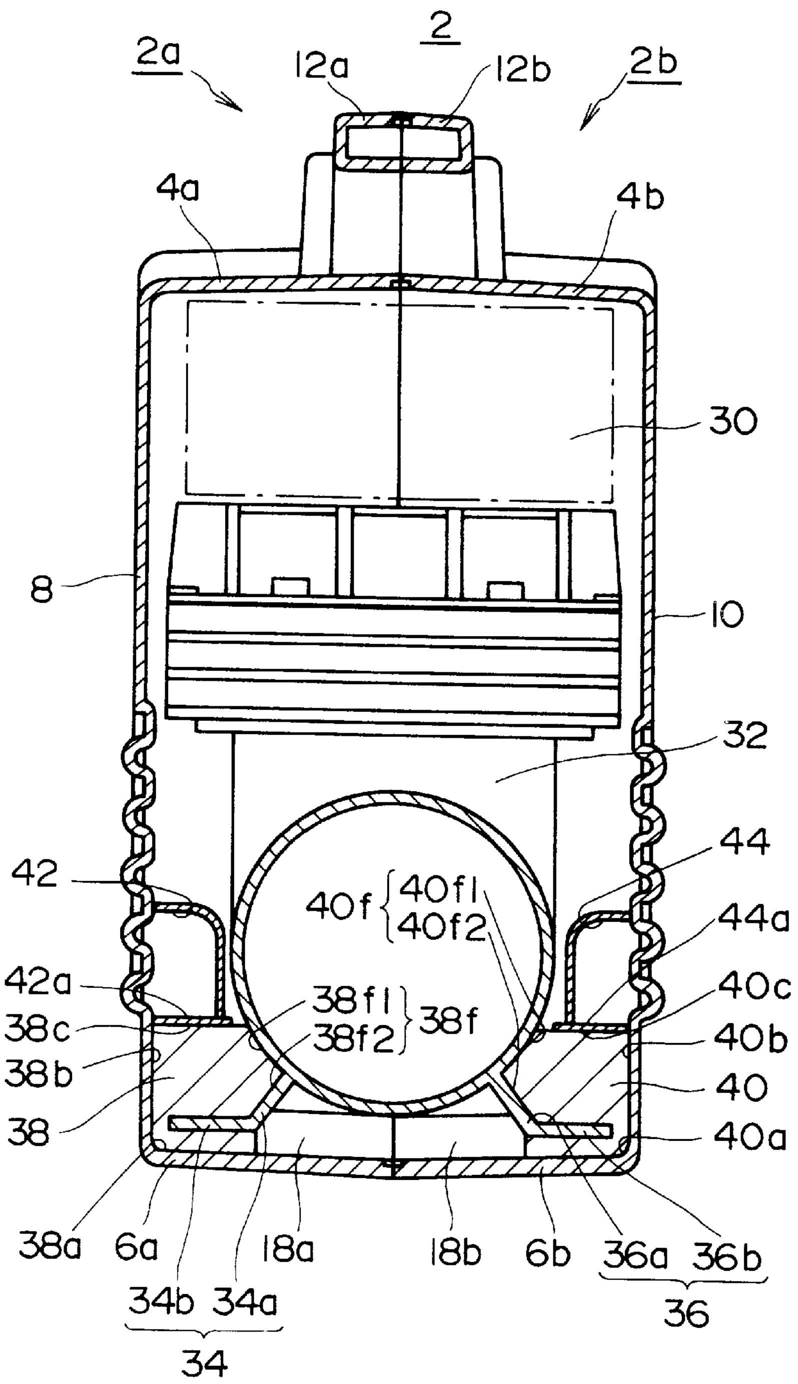
FIG. 2 is a cross-sectional view along the line II—II in FIG. 1, in which the housing half shown removed in FIG. 1 is fixed.

A plasma arc cutter according to one embodiment of the present invention is shown in FIGS. 1 and 2. The plasma arc cutter includes a housing 2, which has an elongated parallelepiped shape and is formed of two housing halves or sections 2*a* and 2*b* having identical shapes. The housing halves 2*a* and 2*b* may be formed of, for example, plastic material.

The halves 2*a* and 2*b* have respective upper elongated panel halves 4*a* and 4*b* and also lower elongated panel halves 6*a* and 6*b* which are in parallel with and vertically spaced from the corresponding upper panel halves 4*a* and 4*b*. The housing half 2*a* also include a side panel 8, which connects one side edge of the upper panel half 4*a* and one side edge of the lower panel half 6*a*. Similarly, a side panel 10 connects one side edge of the upper panel half 4*b* and one side edge of the lower panel half 6*b*.

Handle halves 12*a* and 12*b* having mating surfaces are formed on the respective upper panel halves 4*a* and 4*b*. The locations where the handle halves 12*a* and 12*b* are formed are such that, when the housing halves 2*a* and 2*b* are joined together, the mating surfaces of the handle halves 12*a* and 12*b* abut against each other to form a handle by which the plasma arc cutter can be carried. The handle halves 12*a* and 12*b* may be formed integral with the housing halves 2*a* and 2*b*, respectively.

Grooves 13*a* and 13*b* are formed to open inward or downward in the rear portion of the upper panel halves 4*a* and 4*b*, respectively. Similarly, grooves 15*a* and 15*b* are formed to open inward or downward in the rear portion of the lower panel halves 6*a* and 6*b*, respectively. Only the grooves 13*b* and 15*b* are shown in FIG. 1. Also grooves 21*a* and 21*b* are formed in the rear portion of the side panels 8 and 10. Only the groove 21*b* is shown. The locations of the grooves 21*a* and 21*b* are such that they form, together with the grooves 13*a*, 13*b*, 15*a* and 15*b*, a groove extending around the inner surface of the rear portion of the cutter housing. The peripheral portions of a rear panel 14 are inserted into the grooves 21*a*, 21*b*, 13*a*, 13*b*, 15*a* and 15*b*, to thereby close the rear end portion of the housing.

Similar grooves 17*a*, 17*b*, 19*a* and 19*b* are formed in the front portion of the upper and lower panel halves 4*a*, 4*b*, 6*a* and 6*b*, respectively. Also grooves 23*a* and 23*b* similar to the grooves 21*a* and 21*b* are formed in the front portion of the side panels 8 and 10. The grooves 17*a*, 17*b*, 19*a*, 19*b*, 23*a* and 23*b* forms a continuous groove extending around the inner surface of the front portion of the housing. The peripheral edges of a front panel 16 are held in the grooves 17*a*, 17*b*, 19*a*, 19*b*, 23*a* and 23*b* to close the front of the housing.

Although not shown, control buttons for controlling operating current and other factors of the plasma arc cutter, input and output terminals, an outlet port of compressed air and other necessary controls and switches are disposed on the front and rear panels 14 and 16.

Contact portions 18*a* and 20*a* are formed in the lower panel half 6*a* of the housing half 2*a*. Also contact portions 18*b* and 20*b* are formed in the other lower panel half 6*b* at the corresponding locations to the contact portions 18*a* and 20*a*. The contact portion 20*a* does not appear in the drawings.

The contact portions 18*a* and 20*a* are spaced from each other along the length of the lower panel half 6*a*, and extend across the entire width of the lower panel half 6*a*. Similarly, the contact portions 18*b* and 20*b* are spaced from each other along the length of the lower panel half 6*b*, and extend across the entire width of the lower panel half 6*b*. The locations of the contact portions 18*a*, 18*b*, 20*a* and 20*b* are such that when the housing halves 2*a* and 2*b* are joined together, the inward side surfaces of the contact portions 18*a* and 18*b* and the inward side surfaces of the contact portions 20*a* and 20*b* abut against each other. The contact portions 18*a*, 18*b*, 20*a* and 20*b* may be ribs formed integral with the lower panel halves 6*a* and 6*b*.

The contact portions 18*a*, 18*b*, 20*a* and 20*b* are provided with through-holes 22*a*, 22*b*, 24*a* and 24*b*, respectively. Only the through-holes 22*b* and 24*b* are shown in FIG. 1. A bolt is inserted to extend through the holes 22*a* and 22*b*, and another bolt is inserted to extend through the holes 24*a* and 24*b*. A nut is screwed onto each bolt so that the housing halves 2*a* and 2*b* are fastened together. The bolts and nuts are not shown in the drawings.

Similarly, the handle halves 12*a* and 12*b* are provided with through-holes 26*a* and 26*b* and through-holes 28*a* and 28*b*, respectively. Only through-holes 26*b* and 28*b* are shown. A bolt is inserted to extend through the holes 26*a* and 26*b,* and another bolt is inserted through the holes 28*a* and 28*b*. Nuts are screwed onto the respective bolts to fasten the handle halves 12*a* and 12*b* and, hence, the housing halves 2*a* and 2*b* together. The bolts and nuts are not shown in the drawings.

A power supply unit 30 is installed within the housing 2. The power supply unit 30 receives a commercial AC voltage at power supply input terminals, and rectifies and smoothes the received AC voltage into a DC voltage in an input-side rectifier and smoother unit. The power supply unit 30 includes an inverter, which converts the DC voltage to a high-frequency voltage having a frequency of, for example, from 20 KHz to 100 KHz. The high-frequency voltage is transformed by a transformer. The voltage-transformed high-frequency voltage is rectified and smoothed by an output-side rectifier and smoother unit to develop a DC voltage. The resulting DC voltage developed at power supply output terminals is applied to an arc load. Specifically, the DC voltage is applied, for example, between a torch of the plasma arc cutter and a workpiece to be cut, so that an arc can be generated between them. The power supply unit 30 includes a plurality of printed circuit boards (not shown) on which various components are included, which are disposed in the housing 2.

Also, a compressor 32 is disposed in the housing 2. The compressor 32 may be, for example, an air compressor. The compressor 32 sucks and compresses gas, e.g. air, flowing into the housing 2 through an inlet port (not shown), and supplies the compressed air to the torch through a compressed-air outlet port (not shown). The air supplied to the torch is ionized into plasma by the arc between the torch and the workpiece.

The compressor 32 has legs 34 and 36. As shown in FIG. 2, the legs 34 and 36 include slant portions 34*a* and 36*a,* respectively, which diagonally extends from the bottom of the compressor 32 toward the housing halves 2*a* and 2*b*. Horizontal portions 34*b* and 36*b* extend horizontally from the tip ends of the slant portions 34*a* and 36*a* toward the side panels 8 and 10, respectively. As indicated by broken lines in FIG. 1, the legs 34 and 36 have a given length in the direction along the length of the bottom of the compressor 32.

The legs 34 and 36 are surrounded by or embedded in elastic members 38 and 40, e.g. sponge-like members or rubber-like members. The elastic members 38 and 40 are lumps of elastic material of, e.g. a substantially rectangular parallelepiped shape. The elastic members 38 and 40 have a length along the length of the side panels 8 and 10.

The elastic members 38 and 40 have bottom surfaces 38*a* and 40*a,* which are in surface-contact with the lower panel halves 6*a* and 6*b,* respectively, and also have side surfaces 38*b* and 40*b,* which are in surface-contact with the side panels 8 and 10, respectively. Further, the elastic members 38 and 40 have top surfaces 38*c* and 40*c,* which extend in parallel with the bottom surfaces 38*a* and 40*a*. The top surfaces 38*c* and 40*c* are in surface-contact with horizontally extending bottom surfaces 42*a* and 44*a* of contact portions 42 and 44 projecting inward of the side panels 8 and 10 of the housing, respectively. Lower portions of end surfaces 38*d* and 38*e* of the elastic member 38, which face the front and rear panels 16 and 14 of the housing 2, are in contact with the contact portions 18*a* and 20*a* of the housing half 2*a,* while lower portions of end surfaces 40*d* and 40*e* of the elastic member 40, which face the front and rear panels 16 and 14 of the housing 2, are in contact with the contact portions 18*b* and 20*b* of the housing half 2*b*.

As described above, the surfaces 38*a*–38*e* and 40*a*–40*e* of the elastic members 38 and 40 contact the lower panel halves 6*a* and 6*b,* the side panels 8 and 10, the bottom surfaces 42*a* and 44*a* of the contact portions 42 and 44, and the contact portions 18*a,* 18*b,* 20*a* and 20*b*. Accordingly, the elastic members 38 and 40 are prevented from moving in the vertical direction, in the longitudinal direction (i.e. in the direction toward and away from the front or rear panel) or in the lateral direction (i.e. toward and away from the side panel).

Also, the elastic members 38 and 40 have side surfaces 38*f* and 40*f* opposite to the side surfaces 38*b* and 40*b*. The side surfaces 38*f* and 40*f* include portions 38*f*1 and 40*f*1, respectively, which contact the bottom of the compressor 32, and also include portions 38*f*2 and 40*f*2, which contact the slant portions 34*a* and 36*a* of the respective legs 34 and 36 of the compressor 32. The surface portions 38*f*2 and 40*f*2 are provided with slots at locations corresponding to the horizontally extending portions 34*b* and 36*b* of the legs 34 and 36. The slots extend toward the side panels 8 and 10 and have a size corresponding to the leg portions 34*b* and 36*b*. The horizontally extending leg portions 34*b* and 36*b* are inserted into the slots.

In this way, the compressor 32 is secured in the housing 2 by having the horizontal leg portions 34*b* and 36*b* inserted into the elastic members 38 and 40. It should be noted that no bolts are used to secure the compressor 32.

When the horizontally extending leg portions 34*b* and 36*b* have been inserted into the elastic members 38 and 40, they are spaced from the bottom surfaces 38*a* and 40*a,* the side surfaces 38*b* and 40*b,* the top surfaces 38*c* and 40*c* and the end surfaces 38*d,* 40*d,* 38*e* and 40*e* of the elastic members 38 and 40.

Accordingly, even when the compressor 32 vibrates in the vertical direction, in the longitudinal direction or in the lateral direction during operation, such vibrations are absorbed by the elastic members 38 and 40 and, therefore, substantially no vibrations are transmitted to the housing 2. In particular, vertical vibrations are sufficiently absorbed because the top and bottom surfaces 38*c,* 40*c,* 38*a* and 40*a* of the elastic members 38 and 40 are in surface contact with the lower panel halves 6*a* and 6*b* and the bottom surfaces 42*a* and 44*a* of the contact portions 42 and 44. Without the contact portions 42 and 44, the elastic members 38 and 40 would vibrate vertically and could not absorb the vibrations of the compressor 32.

Also, because the end surfaces 38*d,* 40*d,* 38*e* and 40*e* of the elastic members 38 and 40 are restrained by the contact portions 18*a,* 18*b,* 20*a* and 20*b,* vibrations of the compressor 32 in the longitudinal direction are absorbed by the elastic members 38 and 40. Furthermore, the side surfaces 38*b* and 40*b* of the elastic members 38 and 40 are in contact with the side panels 8 and 10, respectively, and, therefore, vibrations of the compressor 32 in the lateral direction are also absorbed by the elastic members 38 and 40.

Thus, substantially no vibrations of the compressor 32 are transmitted to the housing 2 and, hence, to the printed circuit boards within the housing 2 and to wiring led from the printed circuit boards.

Next, how to assemble the above-described plasma arc cutter is described. First, the housing half 2*a* is placed on a workbench with its inside being viewable. The horizontally extending portions 34*b* and 36*b* of the legs 34 and 36 of the compressor 32 are inserted into the respective slots in the elastic members 38 and 40. Then, the compressor 32 with the elastic members 38 and 40 is positioned with respect to the housing half 2*a*. Specifically, the end surfaces 38*d* and 38*e* of the elastic member 38 are brought into contact with the contact portions 18*a* and 20*a* of the housing half 2*a,* with the bottom surface 38*a* being in contact with the lower panel half 6*a,* with the side surface 38*b* being in contact with the inner surface of the side panel 8, and with the top surface 38*c* being in contact with the bottom surface 42*a* of the contact portion 42.

Next, the edges of the front panel 16 with necessary components mounted on it are placed in the grooves 17*a,* 19*a* and 23*a,* which are not appearing in the drawings. Similarly, the edges of the rear panel 14 with necessary components mounted on it are placed in the grooves 13*a,* 15*a* and 21*a,* which are not appearing in the drawings. After that, an apparatus for operating the compressor 32, components of the power supply unit 30 and the printed circuit boards are positioned in the housing half 2*a,* and necessary wiring is provided.

Next, the other housing half 2*b* are brought to mate with the housing half 2*a* in such a manner that the inner edge surfaces of the upper and lower panel halves 4*a,* 4*b,* 6*a* and 6*b,* the inner edge surfaces of the handle halves 12*a* and 12*b* and the inner edge surfaces of the contact portions 18*a* and 18*b* can abut against the corresponding edge surfaces. When the two halves 2*a* and 2*b* are mated, the other elastic member 40 is automatically placed in a space defined by the lower panel half 6*b,* the bottom surface 42*a* of the contact portion 42, the side panel 10, and the contact portions 18*b* and 20*b*.

Then, bolts are inserted to extend through the through-holes 22*a* and 22*b,* the through-holes 24*a* and 24*b,* the through-holes 26*a* and 26*b* and the through-holes 28*a* and 28*b*. Nuts are screwed onto the respective bolts to fasten the housing halves 2*a* and 2*b* together.

As is understood from the above description, no bolts are used to secure the compressor 32 within the housing 2. This is desirable because it would undesirably require very troublesome working to secure the legs 34 and 36 of the compressor 32 to the two housing halves with bolts. For that, one leg of the compressor 32 would be secured to one of the housing halves by a bolt followed by fastening together the housing halves and then securing the other leg to the other housing half.

In contrast, according to the present invention, since it requires no bolts to secure the compressor 32, the air plasma arc cutter can be assembled easily.

In the above-described embodiment, the end surfaces 38*d* and 38*e* of the elastic member 38 and the end surfaces 40*d* and 40*e* of the elastic member 40 are in contact with the contact portions 18*a* and 18*b* of the lower panel half 6*a* and the contact portions 20*a* and 20*b* of the lower panel half 6*b,* respectively. However, in place of the contact portions 18*a,* 18*b,* 20*a* and 20*b,* two projections may be formed to extend inward from each of the side panels 8 and 10, with which the end surfaces 38*d,* 38*e,* 40*d* and 40*e* of the elastic members 38 and 40 can contact. Similarly, in place of the contact portions 42 and 44 formed on the side panels 8 and 10 which the top surfaces 38*c* and 40*c* of the elastic members 38 and 40 are in contact with, plate-like members may be formed to extend vertically upward from the lower panel halves 6*a* and 6*b* to approximately the same level as the top surfaces 38*c* and 40*c* of the elastic members 38 and 40. Another plate-like member is formed to extend horizontally from the tip end of each of the vertically extending plate-like members, so that the top surfaces 38*c* and 40*c* of the elastic members 38 and 40 can contact with the bottom surfaces of the horizontal plate-like members.

The upper and lower panel halves 4*a* and 6*a,* the side panel 8, the handle half 12*a* and the contact portions 18*a,* 20*a* and 42 may be integrally formed. Similarly, the upper and lower panel halves, the side panel 10, the handle half 12*b* and the contact portions 18*b,* 20*b* and 44 may be integrally formed. Also, the plate-like members useable in place of the contact portions may be formed integral with the other portions.

The compressor 32 has two legs in the above-described embodiment. However, a compressor with one leg or more than two legs may be similarly used. Also, in place of the housing 2 formed of two halves of the same size, any other housing of different structures may be used only if they permit a compressor to be placed therein.

The present invention has been described as being applied to an air plasma arc cutter, but it may be embodied in other plasma arc utilizing apparatuses, such as an air plasma arc welder.

What is claimed is:

1. A plasma arc utilizing apparatus comprising:

a housing;

a power supply unit disposed in the housing for converting an AC voltage to a DC voltage for application to a load for generating an arc;

a compressor disposed in said housing for supplying said load with a compressed gas to be ionized by said arc, said compressor having a leg by which said compressor is secured to said housing; and a lump of elastic material in which part of said leg of said compressor is embedded and which contacts said housing.

2. The plasma arc utilizing apparatus according to claim 1 wherein said housing comprises vertically spaced-apart upper and lower panels and two side panels connecting together the corresponding edges of said upper and lower panels; and said lump of elastic material has contact surfaces contacting said side and lower panels of said housing.

3. The plasma arc utilizing apparatus according to claim 1 wherein said lump of elastic material has top and bottom surfaces; and said housing has contact portions therein, which contact said top and bottom surfaces of said lump of elastic material to prevent displacement in the vertical direction of said lump of elastic material.

4. The plasma arc utilizing apparatus according to claim 1 wherein said housing comprises vertically spaced-apart upper and lower panels and two side panels connecting together the corresponding edges of said upper and lower panels; said lump of elastic material has a bottom surface and two end surfaces extending generally perpendicularly to said side panels of said housing; and said housing has contact portions therein, which contact said bottom and end surfaces of said lump of elastic material.

5. The plasma arc utilizing apparatus according to claim 1 wherein said housing comprises vertically spaced-apart upper and lower panels and two side panels connecting together the corresponding edges of said upper and lower panels; said lump of elastic material has top and bottom surfaces, side surfaces extending generally in parallel with said side panels of said housing, and two end surfaces extending generally perpendicularly to said side panels of said housing; and said housing has contact portions therein, which contact said top, bottom, side and end surfaces of said lump of elastic material to thereby prevent displacement of said lump of elastic material.

6. The plasma arc utilizing apparatus according to claim 1 wherein:

said housing comprises vertically spaced-apart upper and lower panels and two side panels connecting together the corresponding edges of said upper and lower panels, said housing being formed of two housing halves having mating surfaces lying in a plane which is in parallel with said side panels;

said compressor has two legs each being located in one of said two housing halves;

said lump of elastic material is provided in association with each of said two legs of said compressor, each of said lumps of elastic material having a top surface, a bottom surface, a first side surface located near an associated one of said side panels of said housing, a second side surface located remoter from said associated side panel than said first side surface, and two end surfaces extending generally perpendicularly to said side panels of said housing;

each of said two legs of said compressor is embedded in one of said lumps of elastic material through said second side surface of that lump of elastic materials; and said housing further comprises contact portions which contact the surfaces of said two lumps of elastic materials except said second side surfaces, to thereby prevent displacement of said lumps of elastic material.

* * * * *